(12) United States Patent
Tolnar et al.

(10) Patent No.: US 8,335,595 B2
(45) Date of Patent: Dec. 18, 2012

(54) SYSTEM AND METHOD FOR ADAPTIVE ISLANDING FOR STORED/DISTRIBUTED ENERGY DEVICES

(75) Inventors: Jeff Tolnar, Columbus, OH (US); Heidi Caroline, Meadville, PA (US); Larry Hymer, Columbus, OH (US); Michael Bauer, San Francisco, CA (US)

(73) Assignee: BPL Global, Ltd., Sewickley, PA (US)

( * ) Notice: Subject to any disclaimer, the term of this patent is extended or adjusted under 35 U.S.C. 154(b) by 1002 days.

(21) Appl. No.: 12/053,962

(22) Filed: Mar. 24, 2008

(65) Prior Publication Data

US 2008/0231114 A1 Sep. 25, 2008

Related U.S. Application Data

(60) Provisional application No. 60/907,191, filed on Mar. 23, 2007.

(51) Int. Cl.
*G05D 11/00* (2006.01)
(52) U.S. Cl. .......................... 700/295; 700/286; 700/291
(58) Field of Classification Search .......... 700/286–288, 700/291–292, 295; 307/38–39
See application file for complete search history.

(56) References Cited

U.S. PATENT DOCUMENTS

| | | |
|---|---|---|
| 4,551,632 A | 11/1985 | Jourdan et al. |
| 4,682,294 A | 7/1987 | Duc et al. |
| 2004/0095237 A1 | 5/2004 | Chen et al. |
| 2006/0182262 A1* | 8/2006 | Goldman et al. ............. 379/323 |
| 2007/0219755 A1* | 9/2007 | Williams et al. ............. 702/188 |
| 2008/0039979 A1* | 2/2008 | Bridges et al. ............... 700/292 |

FOREIGN PATENT DOCUMENTS

KR  10-2002-0066654 A  8/2002

OTHER PUBLICATIONS

Roberto Caldon, "Adaptive Islanded Configuration for Quality Improvement in Power Delivery Systems with Distributed Generation", Power Tech, 2005 IEEE Russia, pp. 1-6.*
International Search Report for PCT/US2008/003814, dated Jul. 18, 2008.

* cited by examiner

*Primary Examiner* — Mohammad Ali
*Assistant Examiner* — Nathan Laughlin
(74) *Attorney, Agent, or Firm* — Buchanan Ingersoll & Rooney PC

(57) ABSTRACT

When a fault occurs in an energy distribution network, adaptive islanding is initiated to supply energy to customers who are disconnected from the primary source of energy on the network. The customers are selectively connected to secondary energy resources that are distributed within the network. The selected customers are chosen in accordance with a profile that takes into account the amount of energy available from the distributed resources, the expected length of time to repair the fault, the recent energy demands of the customers, and levels of priority that are assigned to respective customers. These factors are monitored, and the selected customers who are connected to the distributed resources are dynamically adjusted during the time that the fault exists.

8 Claims, 8 Drawing Sheets

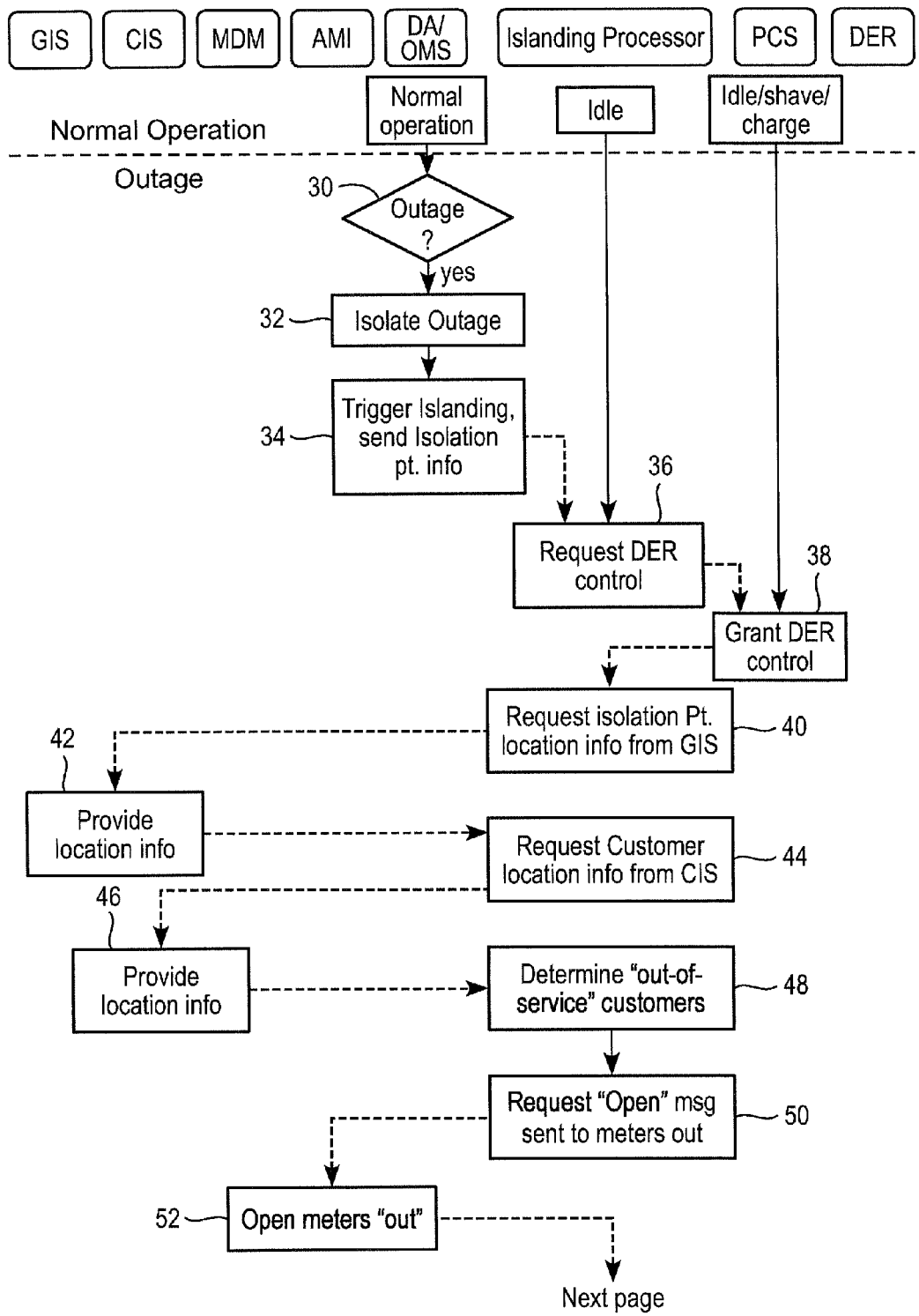

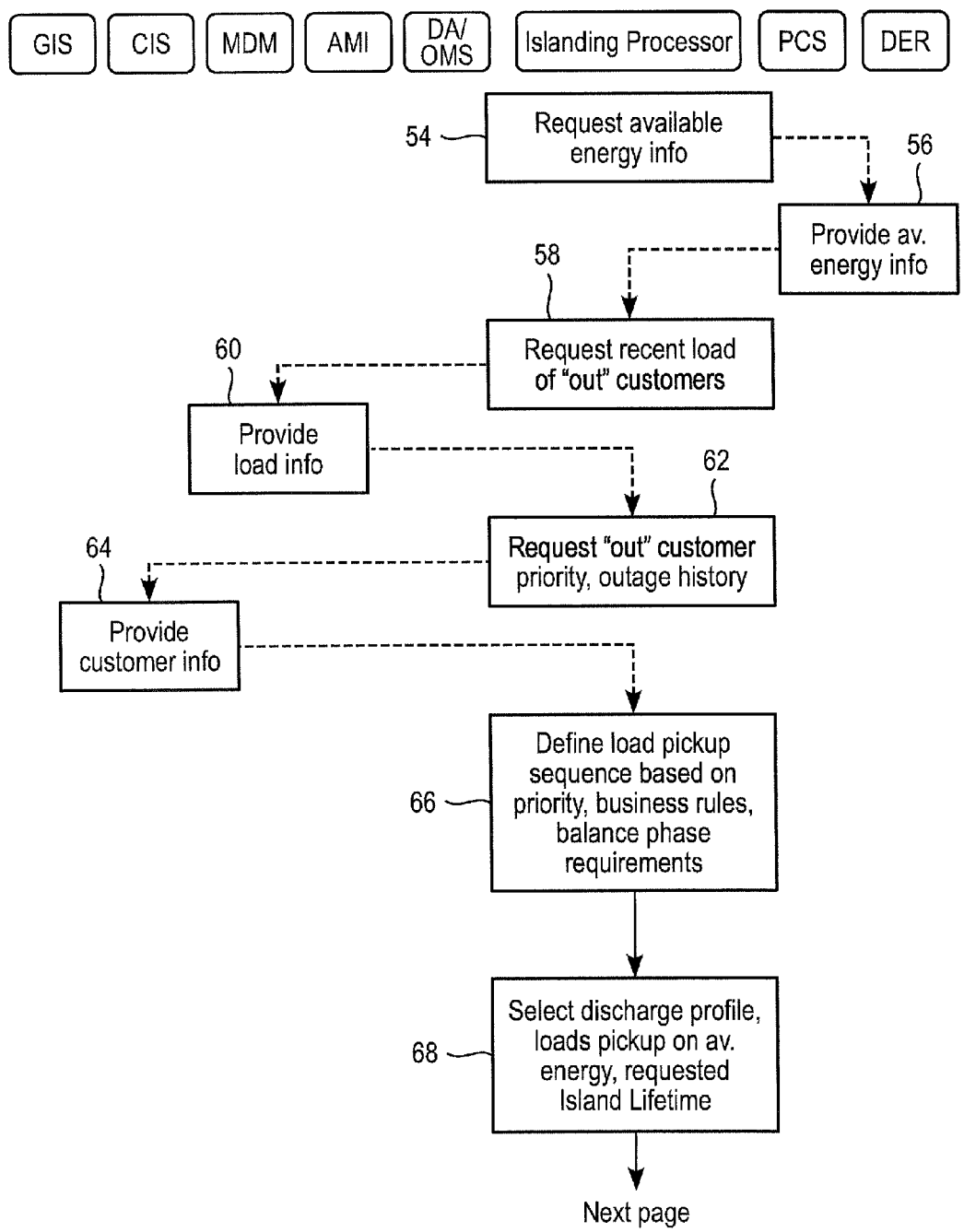

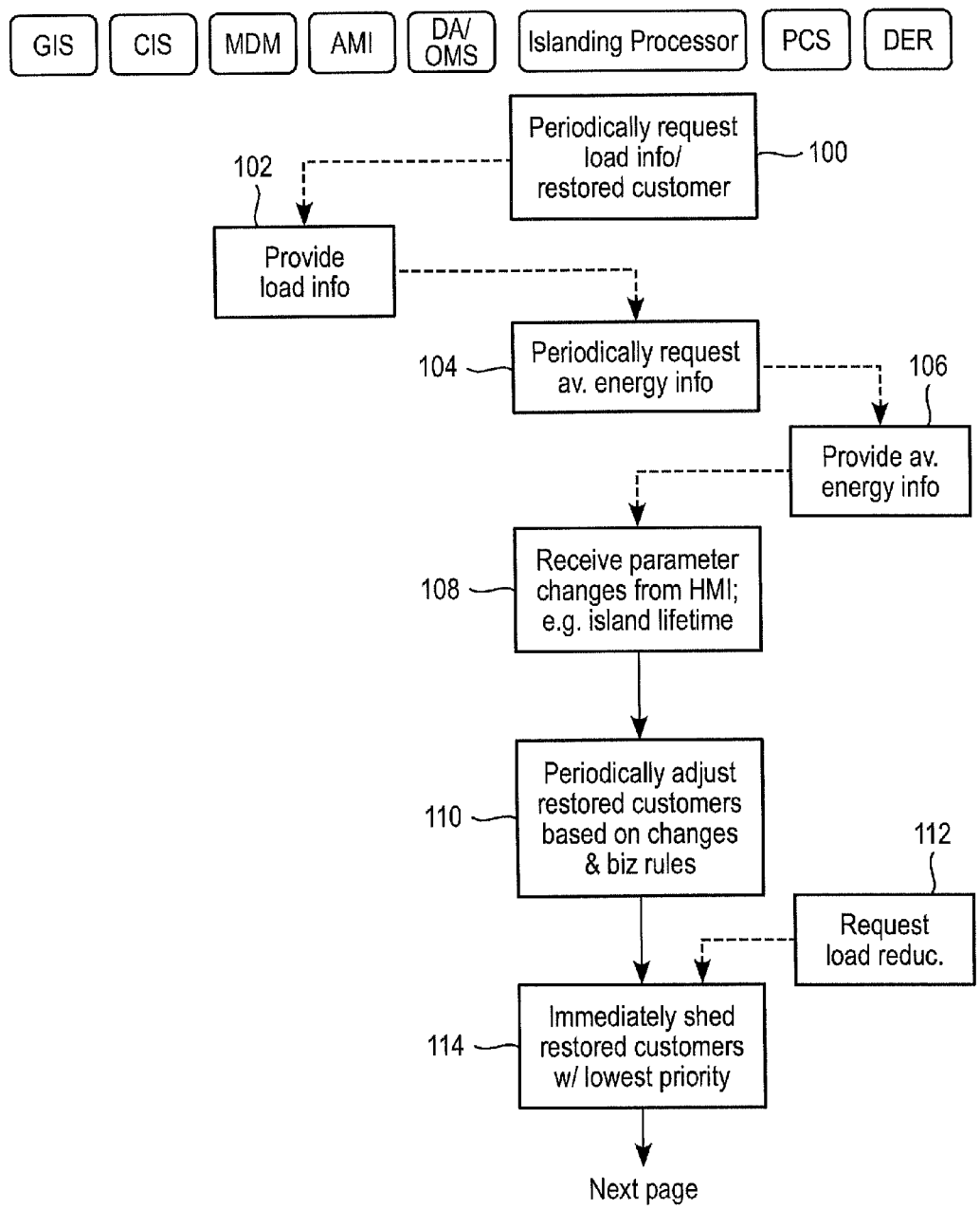

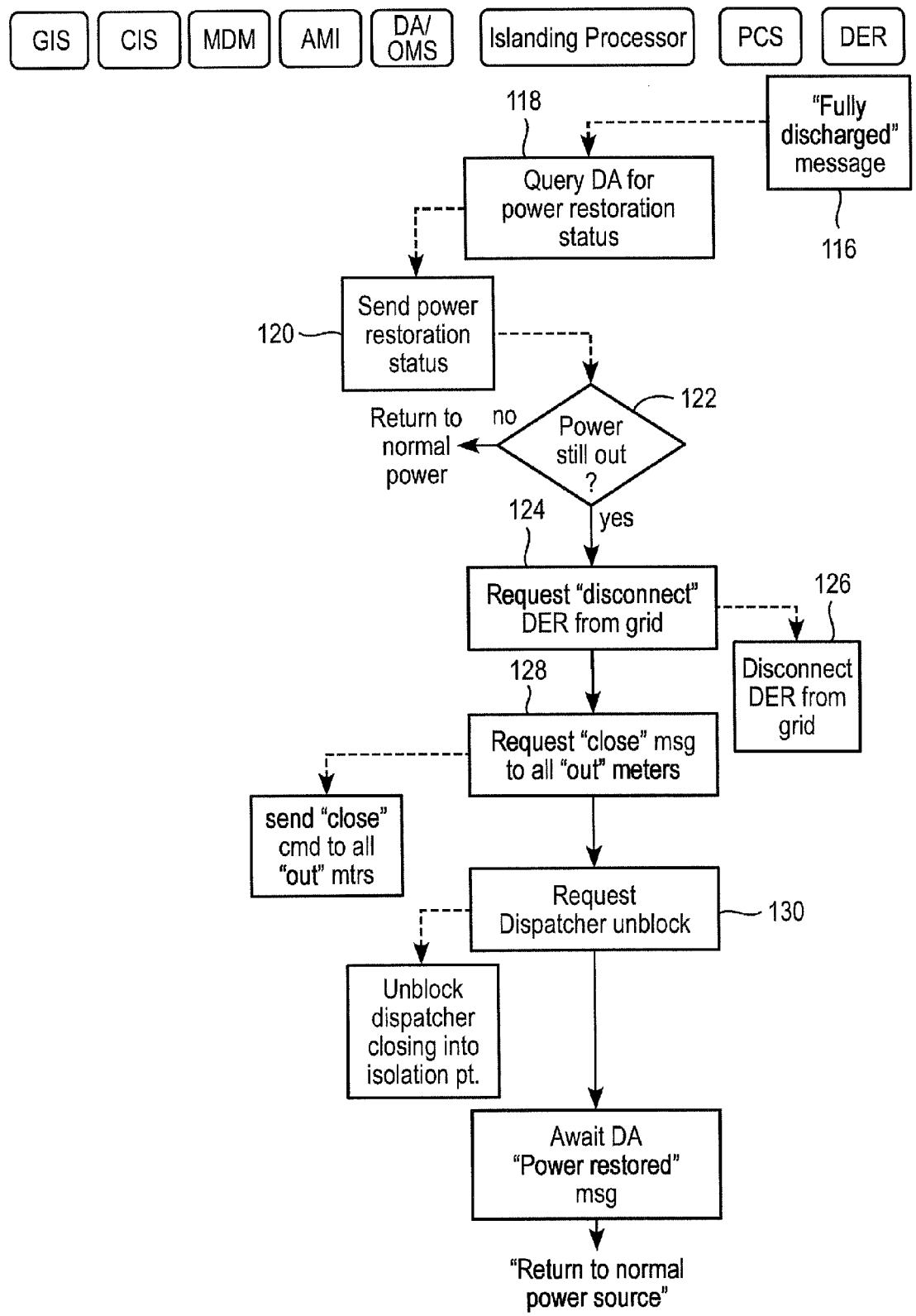

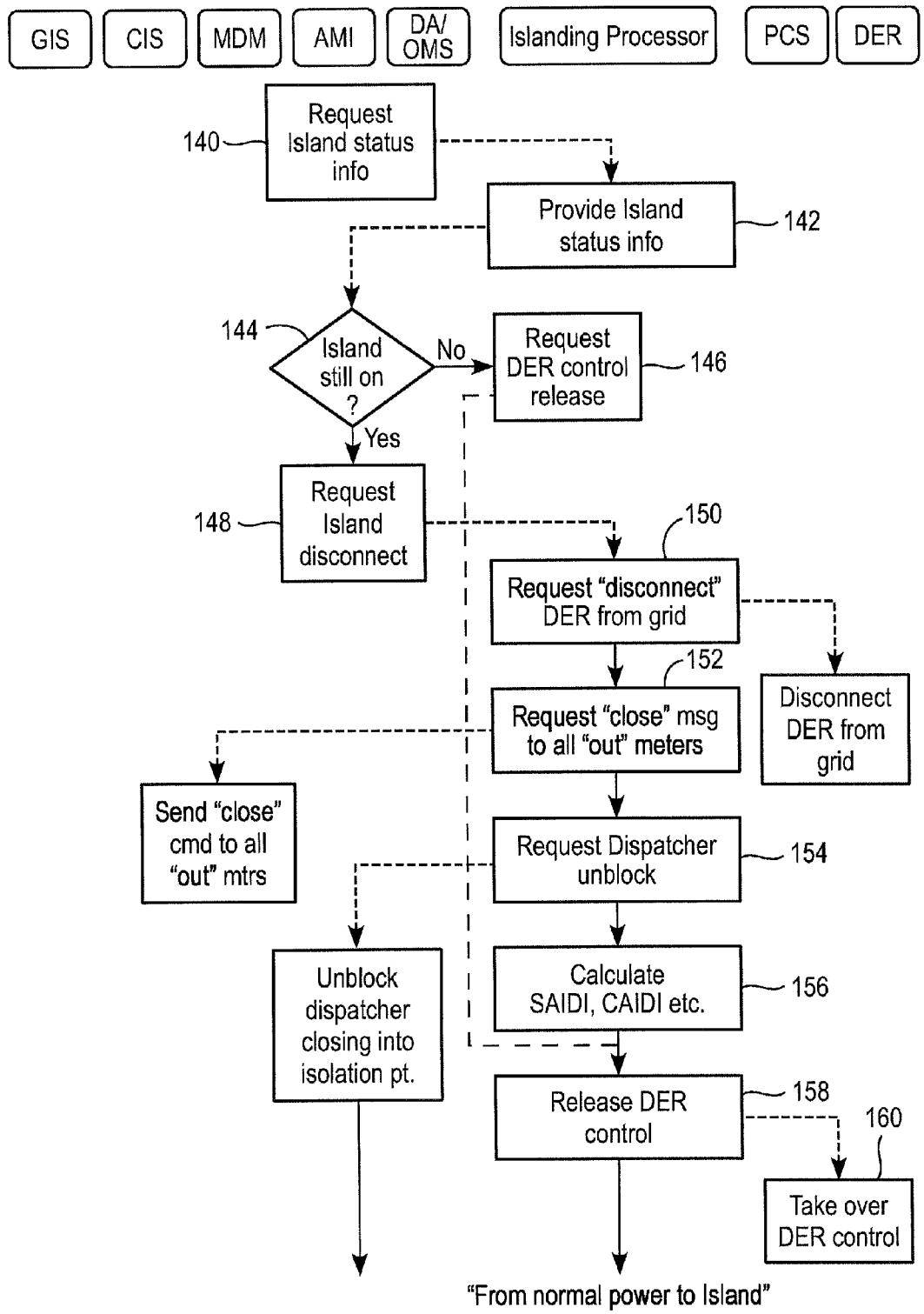

SYSTEM AND METHOD FOR ADAPTIVE ISLANDING FOR STORED/DISTRIBUTED ENERGY DEVICES

RELATED APPLICATION

This disclosure claims the benefit of prior provisional Application No. 60/907,191 filed on Mar. 23, 2007, which is hereby incorporated by reference in its entirety.

FIELD OF THE INVENTION

The present invention relates generally to systems and methods of managing an energy distribution grid having stored/distributed energy devices.

BACKGROUND OF THE INVENTION

In a retail electrical distribution system, stored/distributed energy devices (e.g. diesel generator, NaS Battery, etc.) typically serve two primary purposes. They provide energy for peak shaving during periods of high peak consumption when wholesale electricity prices are at their highest levels. They also provide for improved reliability, when the normal power source is interrupted or absent.

SUMMARY OF THE INVENTION

An adaptive islanding processor coordinates and integrates a stored/distributed energy device with a feeder line in an electrical distribution system to provide power to consumers affected by a disruption in the distribution system.

BRIEF DESCRIPTION OF THE DRAWINGS

FIGS. 3A-3C comprise a flowchart of the operation of the distribution network components to establish an islanding condition;

FIGS. 4A and 4B comprise a flowchart of the operation of the distribution network components to maintain the islanding condition; and FIG. 5 is a flowchart of the operation of the distribution network to return to a normal status after islanding.

DETAILED DESCRIPTION

Figure 1:
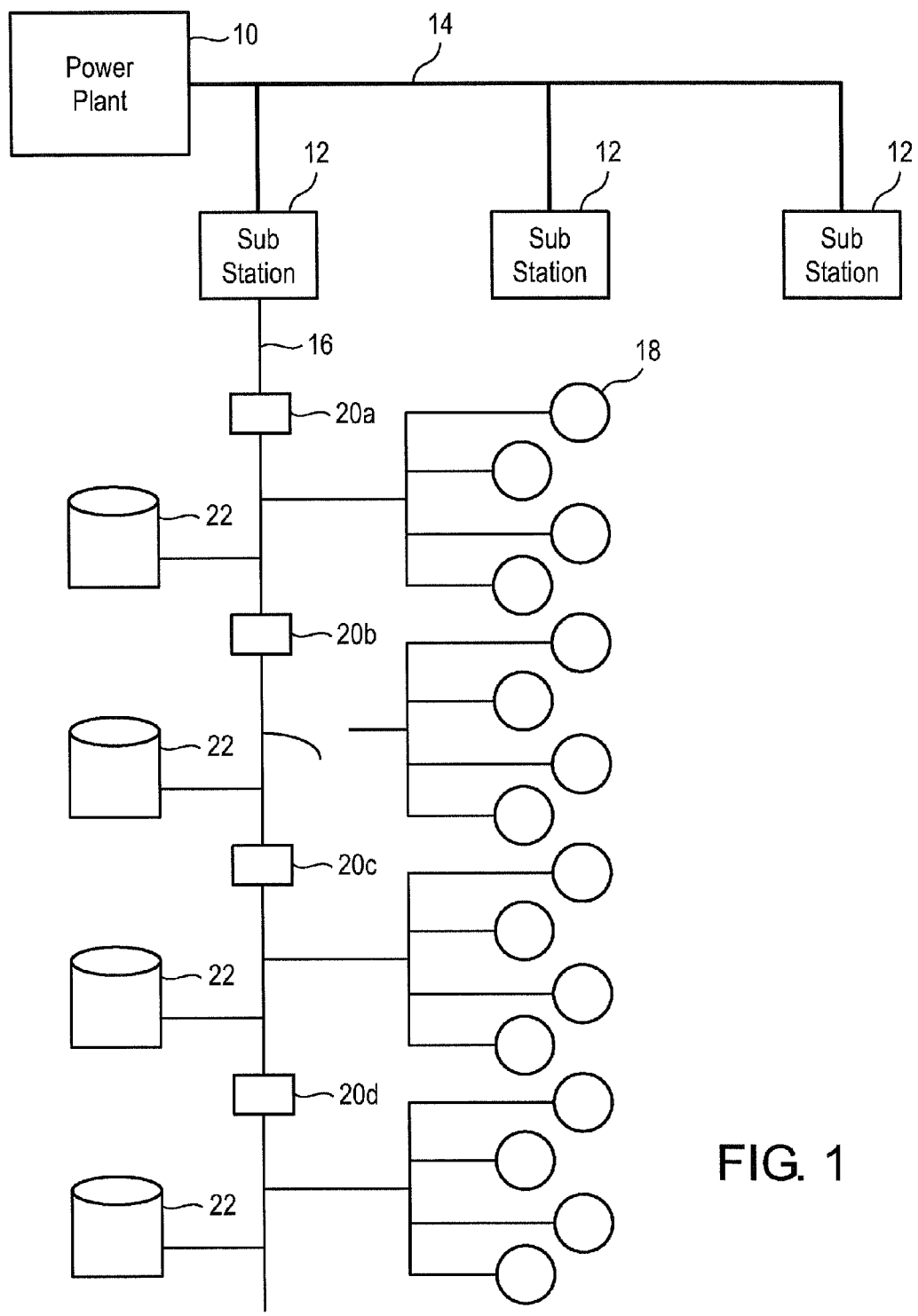
FIG. 1 is a schematic illustration of an energy distribution network with a fault in one of the distribution lines.

For simplicity and illustrative purposes, the principles of the invention are described by referring mainly to exemplary embodiments thereof. However, one of ordinary skill in the art will readily recognize that the same principles are equally applicable to many types of adaptive islanding situations.

An embodiment of the invention involves a software and hardware control system that coordinates and integrates a stored/distributed energy device with the feeder load that it serves within an electrical distribution system. In an embodiment of the present invention, an adaptive islanding processor is configured to perform an adaptive islanding process.

A centralized software program can be used in combination with premise load management devices to automate and enhance the operation of the stored/distributed energy device with the feeder to which it provides service. Premise load management devices (controllers and sensors) can be placed in individual premises and appliances to monitor conditions pertinent to the operation of the controlled load. Operational paradigms under which the adaptive islanding processor may be put into service include, among others, (1) peak shaving and (2) partial restoration for improved feeder reliability.

Peak shaving is typically initiated during times of high distribution system stress when wholesale market prices are at their highest levels. During these periods stress (thermal, electrical, mechanical, etc.) on any given feeder or electrical subsystem are likely to be higher than normal. A stored/distributed energy device which is actively providing capacity during peak conditions is typically doing so at a time when the feeder it supports for reliability purposes is likely to be most stressed. Under a peak shaving operating scenario, the adaptive islanding processor monitors individual customer loads across the feeder and limits those loads to a marginal level to prevent outage due to thermal stress during the period when the stored/distributed energy device is unavailable to supply additional power to the load.

The other role of the stored/distributed energy devices is to deliver stored energy to a portion of an electrical distribution feeder during the absence of the normal power source. Upon the interruption of service to any part of the feeder circuit, the utility's protection and control system operates to isolate the faulted section of that feeder.

If the stored/distributed energy device is located within an area affected by the interruption, the adaptive islanding processor sets up an island and serves the load. The adaptive islanding processor works with devices located at the customer premise to coordinate the islanding process with the stored/distributed energy device power conditioning system (PCS) and the stored/distributed energy device itself.

Among other areas of functionality, the adaptive islanding processor monitors individual loads across a feeder and limits those loads relative to condition parameters. These condition parameters include (1) the forecasted length of feeder outage, and (2) the available level of stored energy available for discharge at any given time. The adaptive islanding processor can employ a comparison algorithm that evaluates these condition parameters in light of the aggregated active load on the feeder to determine a dynamic discharge algorithm over the course of the outage restoration.

The adaptive islanding processor provides the electric utility with the management capability to optimize the value of the stored/distributed energy device through peak shaving and partial feeder restoration. Typically, there are primary phases of the adaptive islanding process, which include among others (1) establish islanding; (2) maintain adaptive islanding; and (3) discontinue adaptive islanding in favor of normal power source. These phases manage the functional components and characteristics of the adaptive islanding processor for the stored/distributed energy devices, to provide end-to-end adaptive islanding functionality.

An example of a situation to which the adaptive islanding procedure can be applied is illustrated in FIG. 1. Electrical power that is produced in a power plant 10 is delivered to a number of substations 12 in an electrical distribution network, by means of a transmission line 14. Each substation has an associated feeder line 16, via which the electrical power is delivered to the individual customer premises in the geographical area served by that substation. In the illustration of FIG. 1, each of the individual customers is represented by a meter 18, which measures the amount of electric power being consumed by that customer.

To provide coordinated protection in the event of a fault in the distribution system, each feeder line includes a number of recloser switches 20 that are spaced along its length. A recloser switch is a form of circuit breaker that has the ability to automatically close after it has been opened due to a fault. FIG. 1 illustrates in an example in which a fault in a distribution line, in this case a break, has occurred between the second and third recloser switches 20*b* and 20*c*. When the fault occurs, each of the recloser switches automatically opens, to interrupt the flow of electricity, in order to protect the customers from any adverse consequences of the fault, e.g., power surges, as well as any personnel or property within the vicinity of the broken line. Thereafter, in a coordinated manner, the switches reclose and, if the fault is no longer detected, remain closed to re-energize an associated segment of the feeder line. If, however, the fault is still detected, the switch will again open.

Through coordinated opening and closing of the switches, the section of the feeder line that contains the fault can be isolated. In the example of FIG. 1, the opening and reclosing of the switches will eventually result in a situation where the second and third switches 20*b* and 20*c* remain open, and all other switches are reclosed. In this situation, all customers located upstream of the second switch 20*b* are able to receive normal power delivered via the substation. Although the segments of the feeder line downstream of the third switch 20*c* do not contain any faults, the customers connected to those segments are without power, because of the intervening faulty segment.

In addition to the power plant 10 as a source of electrical power, the distribution network includes a number of distributed energy sources 22. These distributed sources can take a variety of forms, e.g. batteries, fuel-burning generators, wind turbines, etc. for purposes of explanation, embodiments of the invention are described hereinafter with reference to the use of batteries as the distributed energy sources. It will be appreciated, however, that the principles of the invention are equally applicable to other forms of distributed energy sources.

Also for purposes of explanation, a single distributed energy source is shown as being connected to each segment of the feeder line. It will be appreciated, however, that multiple such distributed energy sources can be connected to any given segment. Likewise, some segments may not have any distributed sources connected directly to them, and therefore must share an energy source with one or more other segments.

In a power distribution network that includes distributed energy sources, a procedure known as "islanding" can be employed to partially restore the distribution of energy during a fault condition such as that depicted in FIG. 1. Specifically, once the faulty section of the feeder line has been isolated, by opening the switches at either end of the faulty segment, the distributed energy sources located downstream of the faulty segment can be activated to supply power to the customers associated with those downstream segments. In other words, the segments that are downstream of the isolated fault form an "island" of customers who are cut off from the power plant 10 and are supplied power from the distributed power sources connected to the island.

Figure 2:
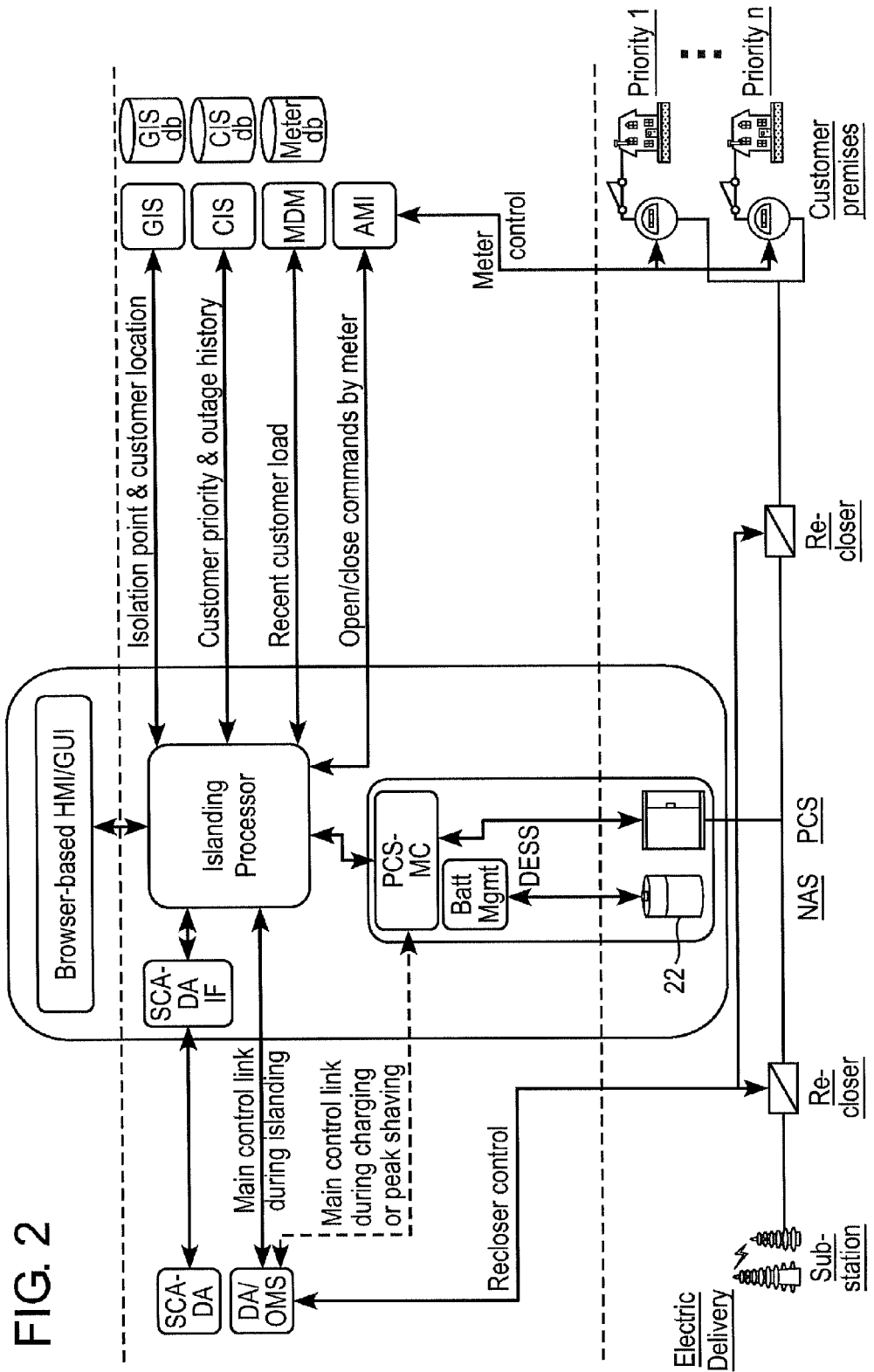
FIG. 2 is a more detailed illustration of the components of the energy distribution network, in accordance with an exemplary embodiment of the invention.

FIG. 2 is a schematic block diagram illustrating the components associated with the islanding processor, and their connection to the power distribution network. The conventional components of such a network include a Supervisory Control Application and Data Acquisition function (SCADA), for general control of the distribution network. The distribution system also includes a distribution automation and outage management system (DA/OMS), for performing specialized operations during peak shaving and outage management. For example, the DA controls the recloser switches 20.

Other conventional components of the distribution system may include a geographical information system (GIS) having an associated database, and a customer information system (CIS), also having an associated database. These two systems provide information pertaining to the geographic locations of components of the distribution network, and the customers serviced by the distribution network. A Meter Data Management System (MDM) stores the data retrieved from customer meters in a database. An Automated Meter Infrastructure (AMI) communicates with the meters, and sends commands for them to open and close their respective connections to the feeder line.

An islanding processor includes suitable interfaces for communicating with each of these existing systems. The processor also communicates with a Distributed Energy Resource (DER). The DER include the distributed energy source 22, e.g. a battery, as well as an associated management component, which determines, for example, the currently available capacity of the energy source. The DER also includes a Power Conditioning System (PCS) that communicates with a monitor/controller, to selectively connect the distributed energy source to the feeder line, and monitor the load presented by the powered devices connected to the feeder line. Control of the operation of the islanding processor is provided by means of a browser-based Human Machine Interface, including a Graphical User Interface (HMI/GUI).

Figure 3C:
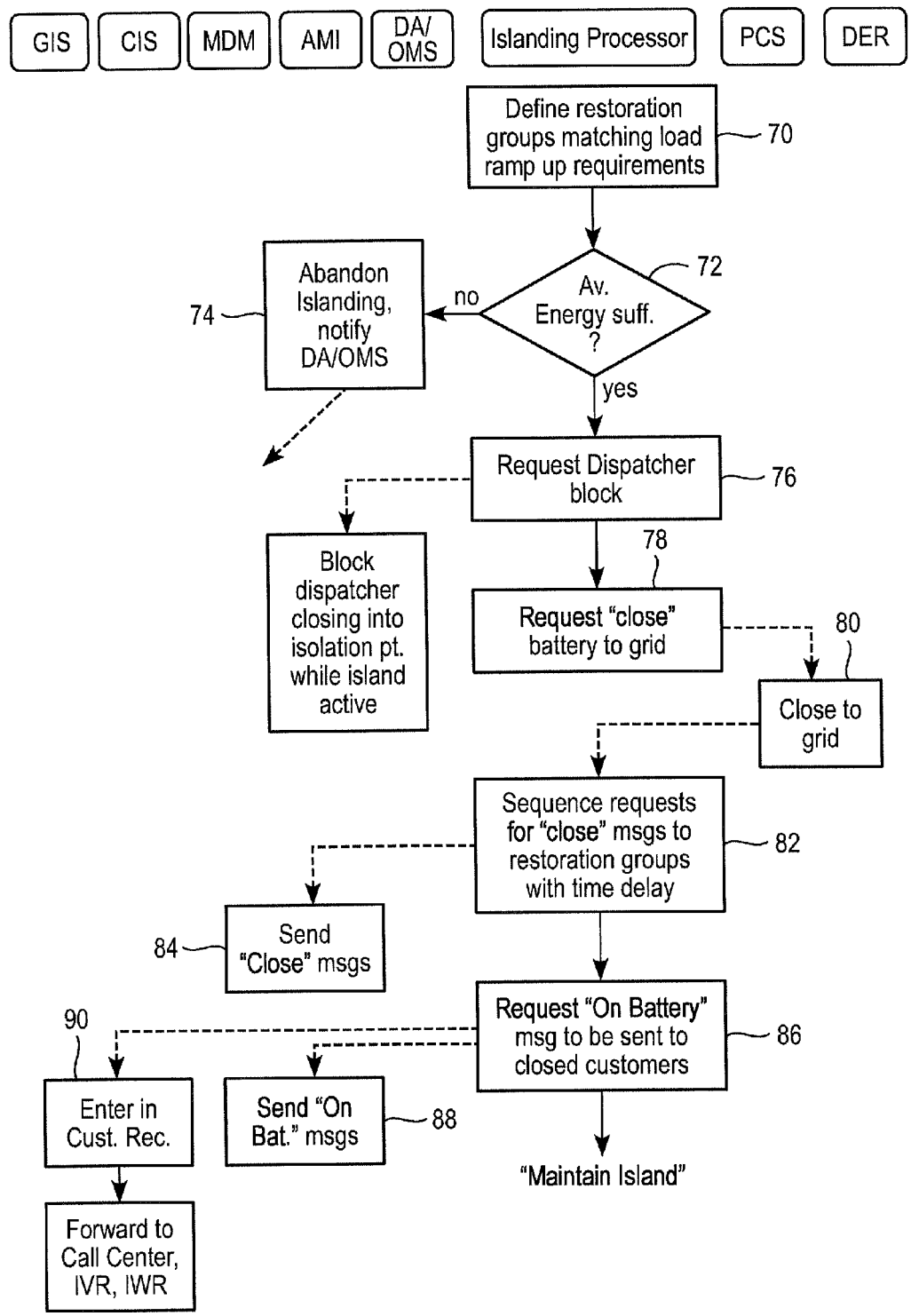

The operations performed by the islanding processor, in conjunction with the other components of the power distribution network, during an outage are depicted in the flow charts of FIGS. 3, 4 and 5. FIGS. 3A-3C depict the operations that occur during the transition from a normal power supply situation, in which all customers along the feeder line receive power from the power plant 10, to an islanding situation. During normal operation, the conventional components of the power distribution network operate in their known manner, and the islanding processor is idle. During this time, the Power Conditioning System (PCS) functions to maintain the battery 22 in a charged state. When an outage situation is detected at step 30, the outage management system operates to isolate the fault, at step 32, through the opening and closing of the recloser switches, in a conventional manner. Once the faulty segment of the feeder line has been isolated, the outage management system sends a command to the islanding processor, at step 34, to trigger the islanding procedure. With this command, the outage management system also sends information relating to the isolated portion of the feeder line.

In response to receipt of this command, at step 36 the islanding processor sends a message, requesting control of the distributed energy stored system. The control is granted at step 38. Once control has been passed over to the islanding processor, it sends a request to the geographic information system at step 40, to obtain information about the location of the isolated segment of the feeder line. This information is provided by the GIS at step 42. In response thereto, the islanding processor issues a subsequent request, to the customer information system at step 44, to obtain information regarding the customers affected by the fault. The requested customer information is provided by the CIS at step 46, and upon receiving this information the islanding processor determines those customers who are currently without electrical service at step 48. In the example of FIG. 1, all customers who are downstream of the third recloser switch 20*c* would be identified. Then, at step 50, the islanding processor sends a request to the automated meter infrastructure, to send an "Open" command to the meters of each of the customers who are without power. This command is sent to the meters by the AMI, at step 52. As a result of this action, each of the individual customer premises is disconnected from the feeder line.

At step 54, the islanding processor sends a message to the distributed energy resource, requesting the amount of energy that is available from the distributed energy sources that are connected to the feeder line downstream of the of the isolated segment. This data is provided by the DER at step 56. Then, at step 58, the islanding processor requests information regarding the most recent load information, i.e. power consumption, of each of the identified customers at the time of the outage. This data is provided by the meter data management system, at step 60. In response to receipt of this data, the islanding processor sends a message to the customer information system at step 62, requesting the priority levels of the customers who are out of service, and their recent outage history. The priority levels that are assigned to the customers can be based upon a number of factors. One such factor may be the type of facility. For example, hospitals and first-responder facilities, such as police stations and fire stations, will typically have the highest priority level, relative to the businesses and residential housing. Priority might also be based upon the type of load at a customer's premises. For instance, a warehouse that stores perishable goods may be given higher priority than a residential unit. This requested information is provided by the CIS, at step 64.

Based upon the information received, the islanding processor defines a sequence in which individual customer loads are to be activated, at step 66. This sequence is based upon the received priority information, and other business rules. In determining the load sequencing, the islanding processor also attempts to balance the load among the different phases of the supplied power.

Based upon the defined sequence, at step 68 the islanding processor selects a discharge profile that can be supported by the available distributed energy sources. This profile can be based upon information pertaining to the estimated duration of the outage. For instance, upon inspecting a fault, service technicians may estimate that it will take about one hour to repair the fault. This estimate is input via the human machine interface and, in response thereto, the islanding processor calculates a profile that of loads that can be supplied from the distributed energy source for one hour. This profile may include customers having lower levels of priority, as well as the highest priority customers. In contrast, if the service technicians are initially unable to provide an estimate of the repair time, a different profile with a smaller aggregate load may be selected, to enable the available energy from the distributed energy sources to be spread out over a longer period of time. In this latter profile, only the highest priority customers may receive power during the islanding operation.

At step 70, the islanding processor defines a group of customers, and/or individual customer devices, to whom power is to be restored, in accordance with the selected profile. After defining these groups, a determination is made at step 72 whether the available energy is sufficient to provide them with power for the estimated duration of the outage. For example, the business rules may require that the distributed energy source provide power to all hospitals and police stations. If the available energy is not sufficient to meet this goal, then a decision may be made to abandon the islanding procedure. If such a determination is made, the islanding processor sends a message to the outage management system at step 74, to notify it that islanding is not taking place. On the other hand, if a determination is made that there is sufficient available energy to implement islanding, a request is sent to a network dispatcher at step 76, to block operation of the recloser switches that were opened to isolate the fault. Typically, once a fault has been cleared, the recloser switches are immediately opened, to restore power to the entire feeder line. However, while islanding is being implemented, power is being supplied by the distributed energy sources. Closing the switches during this situation could result in unexpected surges and/or damage to equipment. The request sent at step 76 forces the switches to remain open during islanding, so that power from the distributed energy sources does not flow into the isolated area.

At step 78, the islanding processor sends a message to the DER, requesting that the distributed energy sources be connected to the feeder line of the power distribution grid. Once the connection is established, the DER sends an acknowledgment to this effect, at step 80. The islanding processor then begins to restore power to the groups that were defined at step 70. In step 82, the islanding processor sends messages to the AMI, requesting it to send "Close" commands to the meters in the defined groups. These messages are spaced from one another, to thereby stagger the times at which the members of the groups have their power restored. If all of the defined groups were activated at the same time, the resulting current demand on the distributed energy source may be more than it is capable of handling. However, by staggering the close messages, the surges caused by the activation can be accommodated by the distributed energy source. In response to these messages, the AMI sends the appropriate "Close" commands to the individual meters of the identified customers, at step 84.

Once a customer's power has been restored, the islanding processor sends a message to the AMI at step 86, requesting it to inform each of these customers that they are currently being supplied with power from the distributed energy source, e.g. a battery. In response to this information, the customers may selectively disable certain loads that are not critical, to thereby reduce the demand on the distributed energy source. At step 88, the AMI sends the requested information to the customers. This data is also recorded by the customer information system, at step 90. At this point, the transition to the islanding operation has been completed.

Thereafter, the islanding processor enters into an island maintenance mode, which is depicted in the flow chart of FIGS. 4A and 4B. At step 100, the islanding processor periodically requests load information regarding each of the restored customers. This information is provided by the AMI system at step 102, and enables the islanding processor to monitor the load on the distributed energy sources. At step 104, the islanding processor requests data on the amount of remaining energy that is available from the distributed energy sources. The DER responds with this information at step 106. Any changes in the parameters relating to the fault are received at step 108. For example, if the service technicians determine that the fault can be repaired more quickly, or may take longer to repair, an updated estimate for the lifetime of the island is input via the human-machine interface. Based upon the updated load information, available energy, and estimated lifetime of the island, the island processor adjusts the customers whose power is being restored by the distributed energy sources, in accordance with the applicable business rules, at step 110.

If the amount of available energy at the distributed energy source drops to a predetermined level, or if there is a sudden change in the condition of the source, e.g. a battery is discharging, the DER may send a request for load reduction, at step 112. In response to this request, the islanding processor sends requests to the AMI at step 114, to instruct those customers with the lowest priority to disconnect from the distribution grid.

Once the available energy from the distributed energy sources has been fully dissipated, e.g., the batteries are fully discharged, the DER sends a message at step 116. In response to this message, the islanding processor sends a query to the outage management system at step 118, and at step 120 the outage management system replies with an indication whether the power has been restored. If the power has been restored, the islanding processor initiates the procedure to return to normal power, at step 122. If, on the other hand, power has not yet been restored, the islanding processor issues a request at step 124, to disconnect the now-dissipated distributed energy resource from the power distribution grid. At step 126, the DER disconnects the distributed energy sources from the feeder line. At step 128, the islanding processor requests the AMI system to instruct all of the meters for the affected customers to reconnect the customer premises to the feeder line. At step 130, the islanding processor informs the dispatcher that the block on the recloser switches can be removed. At this point, the system has returned to a normal outage condition, and the islanding processor awaits a message that power has been restored.

The procedure for returning the system to normal operation, after islanding, is depicted in the flow chart of FIG. 5. Once the fault has been corrected and power distribution can be returned to normal, the outage management system sends a request to the islanding processor at step 140, to determine whether islanding is still being implemented. The islanding processor responds to this request at step 142, and the outage management system determines the status at step 144. If islanding is no longer being implemented, the outage management system requests the islanding processor to release its control of the distributed energy resource, at step 146. Conversely, if islanding is still being implemented, the outage management system sends a message at step 148, requesting the islanding processor to terminate that condition. In response to this request, the islanding processor sends a message to the DER, to disconnect from the power distribution grid, at step 150. It also sends a request to the AMI at step 152, to command all of the meters for the affected customers to close their connections to the feeder line. Then, at step 154 the islanding processor informs the dispatcher that the block on closing the switches can be removed. Appropriate housekeeping is performed at step 156, e.g. calculating various information relating to the outage and the islanding procedure, and logging into a database. Thereafter, the islanding processor releases its control of the DER, at step 158, and a power conditioning system resumes control of the distributed energy sources at step 160.

Dynamic load adjustment and islanded load shedding is made possible by the integration and use of direct load control management algorithms. Taken together, these algorithms are identified as a Demand Dispatch System. The Demand Dispatch System can include a plurality of primary components: the enterprise management platform, communications backbone (Ethernet, BPL, dedicated point-to-point (T1 or frame relay), iDen Wireless, CDMA Wireless, GPRS Wireless, WiFi, and WiMax), radio communication aggregators, premise controllers and premise sensors. The premise controllers and sensors communicate with the enterprise management through the aggregators and the communications backbone. The controllers and sensors can communicate with one or more aggregators wirelessly, such as via radio signals. The premise sensors monitor conditions of interest, such as temperatures of premises or appliances.

In one embodiment, the enterprise management platform continuously monitors conditions for premise temperature and system load utilization throughout the deployed area on a premises by premises basis. It communicates, for example through an IP based network, with remotely located concentrator devices. Other known forms of communications may be employed. The concentrator devices such as the aggregators connect to premise controllers, for example through 900 MHz radio or PLC/BPL links. Again, other known forms of communications may be employed. The controllers interact with the concentrators, sending messages of condition changes at the premise. The messages can be sent as asynchronous messages. The condition changes monitored include internal ambient temperature, voltage and current levels of the device being controlled and the state of the device being controlled (on/off, power factor, load profile).

The enterprise platform manages measured load based upon pre-established criteria or thresholds that the utility (or load management company) monitors and controls. For peak shedding the technology can be applied at several levels. The system demand limiting functions allow the utility to select a maximum level of system demand, either across the utility's entire electrical grid or in specific sections of the electrical grid down to the individual transformer or specific premise. Demand can be limited by managing individual premise loads in critical situations and can be applied across all premise loads to avoid blackout conditions. Active measured loads are incrementally and dynamically cycled while premise conditions are continuously monitored. Power cycling is granular with specific utility specified upper and lower set points. These set points are constantly monitored by the central system and cycling can be performed at either the individual device level or for the entire load area.

In one embodiment, the enterprise platform maintains a system wide inventory of potentially interruptible load. This can be accomplished by having the system poll all of the demand controllers periodically, every 5 minutes for example, gathering information including 1) ambient temperature, 2) controlled device state (on/off) and 3) controlled device voltage and current. Periodic self reporting by the demand controllers can also be employed.

The data, once obtained, are placed in a database accessible by the enterprise management platform, listing the premise controller ID, the ambient temperature, device state (on/off) and the status of the voltage and current. The data are then correlated with other information in the database, like physical address, customer temperature preference, and customer shed priority.

When the adaptive islanding processor calls for a curtailment in load demand in the effected service area, the system starts shedding loads, based on predefined parameters of device priority, customer priority and distributed energy device power factor and calculates a cumulative total of all device loads for those that are running and compares the desired reduction with the running cumulative total.

The system creates groups of customers, based on priority, whose device loads add up to the amount of load to be shed within the individual service level parameters. When these groups have been set up, the system sends commands to the respective premise controllers to signal the controller to open a relay and interrupt the power to the controlled device. The controller then sends a time stamped response to the system to notify that the device has indeed been interrupted.

By comparing this change of state to the previous load used by this device, the system knows exactly how much load was shed and when.

The system continuously monitors the load that is required to be shed, available load, and individual service parameters. The system selects the next group/device whose total power consumption matches the current desired demand curtailment. Commands are then sent to that set of premise controllers. Thus the shedding of load is dynamically rotated among the entire managed customer load based on utility specified priorities of device, customer and distributed energy device power factor. This process continues until the grid no longer needs the curtailment.

Priorities are specified by a number of factors: Controlled device (HVAC, Water Heaters, Pool Pumps, etc), customer priority and customer preferences. The controlled devices can represent anything at the premise that consumes energy. The utility can set a priority of when certain devices are considered for demand curtailment and set a priority for each device. The algorithm will systematically group each device into the priority specified and shed from lowest priority to highest until the demand curtailment is satisfied. The utility can also set a priority of customers based on the amount of time their devices have been manipulated, amount of overall blackout time, etc. (these can be utility specified criteria). The enterprise management platform produces a cumulative total of possible demand curtailment using A/C compressor load.

As the system peak falls, fewer and fewer interruptions are required until eventually all load is restored to normal operation. This is constantly communicated between the central load dispatcher and the enterprise management platform by updating the amount of power demand that must be dispatched.

As an alternative embodiment, the adaptive islanding processor can be integrated into the electrical distribution system at varying levels of integration complexity. The more complex the integration, the more granular the management capability of the adaptive islanding processor with respect to the extension of energy life to serve islanded customers during a distribution system restoration. The levels of complexity include among others (1) Integration at the electrical distribution system feeder level, (2) integration at the customer level, and (3) integration at the individual load level. These levels are described in more detail in the following table.

| Adaptive Islanding Integration Level | Functionality Description |
| --- | --- |
| Entire Feeder (Zoned Islanding) | Adaptive Islanding Processor controls feeder switches |
| Customer by Premise (by location) | Adaptive Islanding Processor controls AMI collars, preprogrammed with reads by customer location via GIS and CIS integration points |
| Customer by Premise (by priority) | Adaptive Islanding Processor controls AMI collars with reads by customer priority via CIS integration point |
| Customer by Premise (by outage history) | Adaptive Islanding Processor controls AMI collars, preprogrammed with reafs by customer history via CIS integration point |
| Entire Feeder (Zoned Islanding) | Adaptive Islanding Processor controls premise controllers at customer location with utility supplying business rules for governance via configuration tools |
| Customer by Premise (by location) | Adaptive Islanding Processor controls premise controllers at customer locations, provides utility with management options for any integration parameter |

It will be appreciated by those skilled in the art that the present invention can be embodied in other specific forms without departing from the spirit or essential characteristics thereof. The presently disclosed embodiments are therefore considered in all respects to be illustrative and not restricted.

What is claimed is:

1. A method for providing energy to a group of consumers via an energy distribution network having distributed energy sources, during a disruption in the distribution network, comprising the following steps:
   determining a group of consumer premises to which distribution of the energy via the network has been interrupted and which are eligible to receive energy from one or more distributed energy sources;
   determining the amount of energy that is available to be supplied to said determined group of consumer premises from said one or more distributed energy sources;
   defining a profile for supply of energy to consumer premises in said determined group, wherein said profile is based upon said determined amount of available energy from said one or more distributed energy resources, an anticipated duration of the disruption in the distribution network, and data describing energy requirements of consumer premises in said determined group including predetermined device priorities of devices within said consumer premises;
   selecting particular devices from a plurality of devices within said consumer premises in said determined group, said selected particular devices to be supplied energy from said one or more distributed energy sources, based upon said profile; and
   connecting the selected particular devices from said plurality of devices within said consumer premises to said one or more distributed energy sources, to thereby supply the selected particular devices with energy during the disruption in the distribution network.

2. The method of claim 1, wherein the step of determining consumers who are eligible to receive energy comprises identifying an isolated portion of the distribution network that contains a fault, and determining consumers who are disconnected from a source of energy on the distribution network as a result of said isolated portion.

3. The method of claim 2, further including the step of sending a command to consumers disconnected from the distribution network, and wherein said connecting step includes sending a second command to the consumers associated with selected particular devices to re-connect said selected particular devices to the distribution network.

4. The method of claim 1, wherein said data energy requirements of consumers in said group includes recent consumption of the energy by the respective consumers.

5. The method of claim 1, wherein said data describing energy requirements of consumers in said group includes historical data regarding interruption in the supply of energy to respective consumers in said group.

6. The method of claim 1 further including the steps of receiving information regarding a change in the anticipated duration, adjusting said profile in accordance with said change, and revising the selected particular devices, which are connected to the distribution network in accordance with the adjusted profile.

7. A method for providing energy to a group of consumers during a disruption in a distribution network, comprising the steps of:
   determining a group of consumer premises to which distribution of energy has been interrupted and which are eligible to receive energy from one or more distributed energy sources;
   defining a profile, for the selection of particular devices from a plurality of devices within the determined group of consumer premises to which energy is to be supplied from said one or more distributed energy sources, based upon a (i) determined amount of available energy from said one or more distributed energy sources, (ii) an anticipated duration of the disruption in the distribution network, and (iii) data describing energy requirements of consumer premises in said determined group including predetermined device priorities of devices within the consumer premises;

connecting selected particular devices within consumer premises to said one or more distributed energy sources, said selected particular devices (i) having been selected on a basis of said defined profile and (ii) are to be supplied energy during the disruption in the distribution network; and monitoring the available energy from said one or more distributed energy sources while said selected particular devices are connected to the distributed energy sources, and selectively adding or removing devices to the selected particular devices in accordance with changes in the available energy.

8. The method of claim 1 further including the steps, in response to an indication that the disruption has ceased, disconnecting the selected particular devices from the distributed energy sources, and connecting the selected particular devices to the distribution network.

* * * * *